United States Patent
Drobnjak et al.

(10) Patent No.: US 8,692,523 B2
(45) Date of Patent: Apr. 8, 2014

(54) POWER GENERATION SYSTEM AND METHOD WITH VOLTAGE FAULT RIDE-THROUGH CAPABILITY

(75) Inventors: Goran Drobnjak, Ismaning (DE); Simon Herbert Schramm, München (DE); Christof Martin Sihler, Hallbergmoos (DE)

(73) Assignee: General Electric Company, Niskayuna, NY (US)

( * ) Notice: Subject to any disclaimer, the term of this patent is extended or adjusted under 35 U.S.C. 154(b) by 965 days.

(21) Appl. No.: 12/611,988

(22) Filed: Nov. 4, 2009

(65) Prior Publication Data

US 2011/0101927 A1    May 5, 2011

(51) Int. Cl.
*H02P 11/00* (2006.01)
*H02P 9/00* (2006.01)
*H02P 9/04* (2006.01)
*F03D 9/00* (2006.01)

(52) U.S. Cl.
USPC ................ 322/44; 322/37; 290/44

(58) Field of Classification Search
USPC ............ 322/37, 44, 89, 24, 28; 307/103
See application file for complete search history.

(56) References Cited

U.S. PATENT DOCUMENTS

| | | | | |
|---|---|---|---|---|
| 2,402,258 A | * | 6/1946 | Norton et al. | 340/286.02 |
| 2,578,235 A | * | 12/1951 | Few | 307/149 |
| 5,127,085 A | * | 6/1992 | Becker et al. | 318/434 |
| 5,172,046 A | * | 12/1992 | Dittner et al. | 322/89 |
| 5,686,766 A | * | 11/1997 | Tamechika | 307/43 |
| 5,902,506 A | * | 5/1999 | Scott et al. | 219/608 |
| 2003/0015873 A1 | * | 1/2003 | Khalizadeh et al. | 290/7 |
| 2003/0048006 A1 | * | 3/2003 | Shelter et al. | 307/64 |
| 2004/0245783 A1 | * | 12/2004 | Gilbreth et al. | 290/52 |
| 2006/0267560 A1 | | 11/2006 | Rajda et al. | |
| 2008/0018309 A1 | | 1/2008 | Erdman et al. | |
| 2008/0137382 A1 | * | 6/2008 | Datta et al. | 363/35 |
| 2009/0079191 A1 | * | 3/2009 | Mari et al. | 290/43 |
| 2009/0167088 A1 | * | 7/2009 | Llorente Gonzalez et al. | 307/60 |
| 2010/0123313 A1 | * | 5/2010 | Hobdy | 290/42 |

FOREIGN PATENT DOCUMENTS

| | | |
|---|---|---|
| EP | 0677911 A1 | 7/1995 |
| EP | 1803932 A1 | 7/2007 |
| WO | WO 2006/070958 A1 * | 7/2006 |

OTHER PUBLICATIONS

Causebrook et al.; "Fault Ride-Through of Large Wind Farms Using Series Dynamic Braking Resistors (Mar. 2007)"; IEEE Transactions on Power Systems, vol. 22, No. 3, Aug. 2007; Downloaded from Internet:<http://rogue.ncl.ac.uk/file_store/nclep_981221143917.pdf>; pp. 966-975.

A Causebrook, D J Atkinson, A G Jack; "Fault Ride-Through: Shifting the Balance of Power From Blade Pitch to Electrical Resistance"; Downloaded from Internet:<http://www.colorsofthecity.org/allfiles2/136_Ewec2006fullpaper.pdf>; 7 pages.

(Continued)

*Primary Examiner* — Julio Gonzalez
(74) *Attorney, Agent, or Firm* — Nitin N. Joshi

(57) ABSTRACT

A power generation system includes a generator mechanically coupled to a turbine to generate electrical power. The system includes a fault ride through system having a variable resistor and a variable inductor. The variable resistor is connected in parallel across output terminals of the generator to absorb power from the generator during a grid fault condition, and the variable inductor is connected between an output terminal of the generator and a power grid.

19 Claims, 3 Drawing Sheets

(56) References Cited

OTHER PUBLICATIONS

M. Tsili, Ch. Patsiouras, S. Papathanassiou; "Grid Code Requirements for Large Wind Farms: A Review of Technical Regulations and Available Wind Turbine Technologies"; Downloaded from Internet: <http://users.ntua.gr/stpapath/Paper_2.72.pdf>; 11 Pages.
PCT/US2010052235 Search Report, Mar. 1, 2011.

* cited by examiner

POWER GENERATION SYSTEM AND METHOD WITH VOLTAGE FAULT RIDE-THROUGH CAPABILITY

BACKGROUND

This invention relates generally to electric energy conversion, and, more specifically, to a system and a method for low voltage ride through capability of small synchronous generators with low moments of inertia connected to a power grid.

In traditional electric power systems, most of the electrical power is generated in large centralized facilities, such as fossil fuel (coal, gas powered), nuclear, or hydropower plants. These traditional plants have excellent economies of scale but usually transmit electricity long distances and can affect to the environment. Distributed energy resource (DER) systems are small power generators (typically in the range of 3 kW to 10,000 kW) used to provide an alternative to or an enhancement of traditional electric power systems. Small power generators may be powered by small gas turbines or may include fuel cells and/or wind powered generators, for example. DER systems reduce the amount of energy lost in transmitting electricity because the electricity is generated very close to where it is used, perhaps even in the same building. DER systems also reduce the size and number of power lines that must be constructed. However, due to increased use of small generators, some utilities are now requiring that small generators provide enhanced capabilities such as fault voltage ride through.

When a fault in the utility system occurs, voltage in the system could decrease by a significant amount for a short duration (typically less than 500 milliseconds). Faults can be caused by at least one phase conductor being connected to ground (a ground fault) or by the short circuiting of two or multiple phase conductors. These types of faults occur during lightning and wind storms, or due to a transmission line being connected to the ground by accident. For the purposes of this specification, the term "fault" is intended to cover significant voltage reduction events. The term "fault" as used herein, is intended to cover any event on the utility system that creates a momentary reduction or increase in voltage on one or more phases. In the past, under these inadvertent fault and large power disturbance circumstances, it has been acceptable and desirable for small generators to trip off line whenever the voltage reduction occurs. Operating in this way has no real detrimental effect on the supply of electricity when small generator power penetration is low. However, as penetration of small generators on the grid increases, it is desirable for a small generator to remain on line and ride through such a low voltage condition and even more important to stay in synchronism, being able to generate energy after the fault is cleared. This new operation is similar to the requirements applied to traditional generating sources such as fossil fueled synchronous generator plants.

Therefore, it is desirable to determine a method and a system that will address the foregoing issues.

BRIEF DESCRIPTION

In accordance with an embodiment of the present invention, a power generation system is provided. The system includes a generator mechanically coupled to a turbine to generate electrical power and a fault ride through system. The fault ride through system includes a variable resistor and a variable inductor. The variable resistor is connected in parallel across output terminals of the generator to absorb power from the generator during a grid fault condition and the variable inductor is connected between an output terminal of the generator and a power grid.

In accordance with another embodiment of the present invention, a method of supplying electrical power to a power grid from a power generation system is provided. The power generation system includes a variable inductor connected between a generator and the power grid and a variable resistor connected across output terminals of the generator. The method includes controlling the variable inductor to have a lower inductance during normal operating conditions and a higher inductance during fault conditions so as to develop a voltage across the variable resistor during fault condition. The method further includes transferring output power of the generator to the variable resistor during fault conditions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a system and a method for low voltage ride through capability of small synchronous generators with low moments of inertia connected to a power grid.

Figure 1:
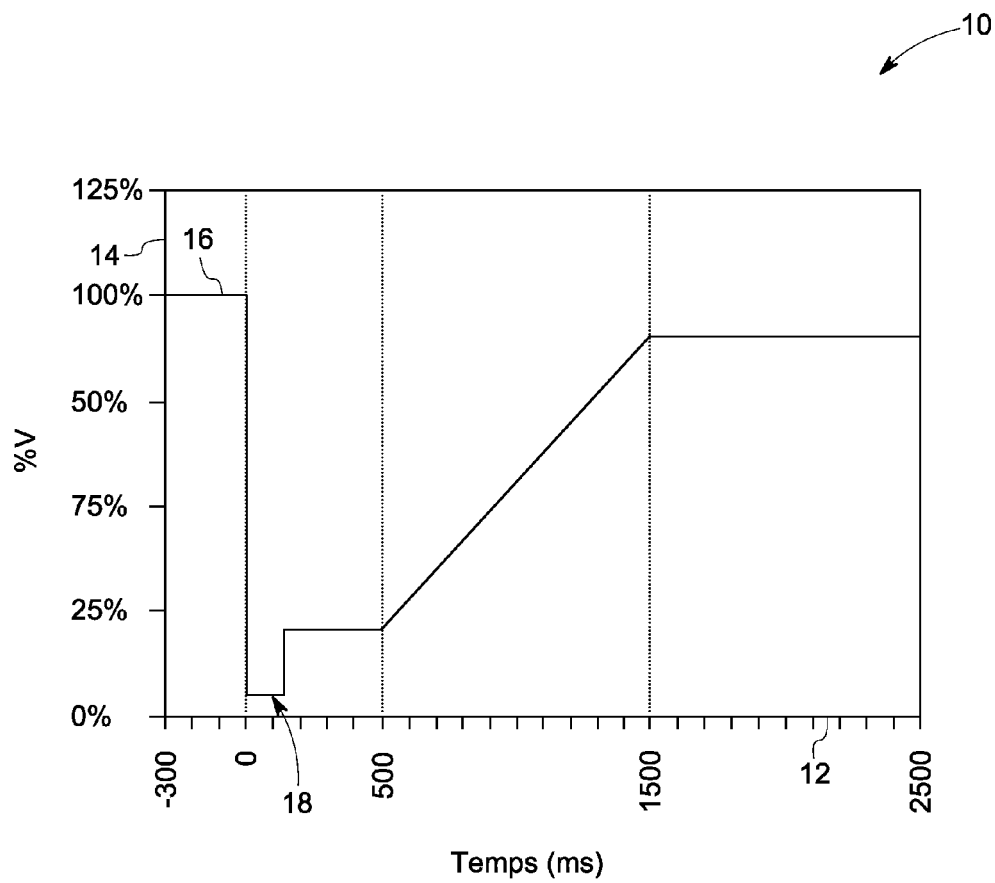
FIG. 1 is a plot of a grid code defined voltage profile during and right after a fault.

FIG. 1 illustrates a plot 10 of an example of a grid code voltage profile at the point of connection (POC) of a generator to the power grid. Some of the grid authorities expect that the generators should not be disconnected from the grid if the voltage at POC is higher than the voltage profile shown. However, this is one exemplary case, and the voltage profile requirement may vary from country to country or from grid authority to grid authority. The fault may occur due to lightning and wind storms, for example. The fault may be of type such as a single line to ground fault, double line fault, or three phase fault. The plot 10 shows a horizontal axis 12 representing time in milliseconds and a vertical axis 14 representing voltage in percentage. The fault occurs at 0 milliseconds away from the POC. Before the fault, the system is in stable condition, so the pre-fault voltage 16 at POC i.e. before 0 milliseconds is 100% or 1 per unit. As the fault represents a short circuit, the voltage 18 at 0 milliseconds drops down to 5% at the beginning of the fault. It should be noted that the voltage at the POC depends on the distance of fault to POC, the impedance, the voltage level, the kind of fault, and so forth. In one embodiment, the voltage may be lower than 5%, or in another embodiment; the voltage may be greater than 5%.

When the voltage falls to levels as illustrated in FIG. 1, it is likely that the generator is not able to export full energy to the grid. If the mechanical power produced by the prime mover continues to deliver energy to the generator rotor, this will result in acceleration of the engine rotating masses, and the rotor speed will increase. The increase of the rotor speed will result in excessive increase of the generator power angle which may cause a loss of synchronism. Therefore, the generator will trip and not fulfill the required grid code. In the example grid code voltage profile shown, the fault duration on the transmission line is shown as 150 ms. At 150 ms, the fault is cleared or one of the zone protections is activated, thus the voltage goes up to 20%. Further at 500 ms, other zone protections are activated and the voltage returns to 90% within 1 second.

Figure 2:
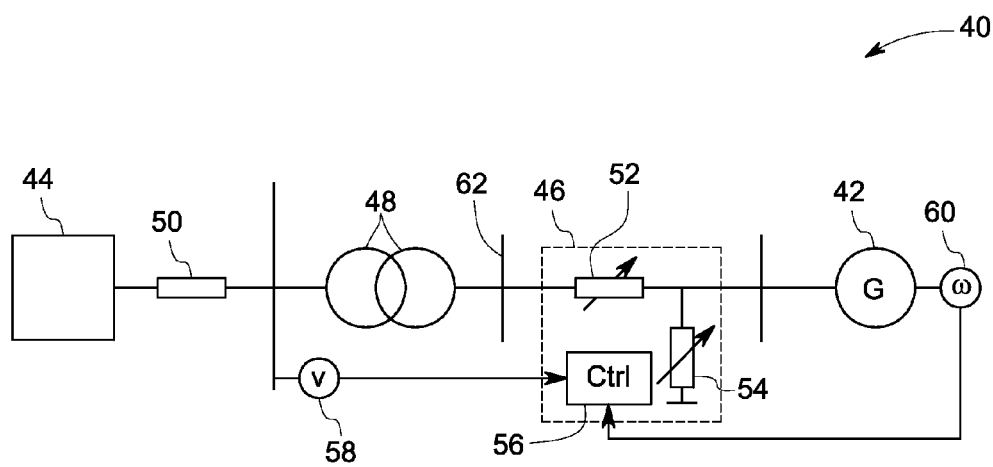
FIG. 2 is a diagrammatical representation of a power grid system utilizing a fault ride through system in accordance with an embodiment of the present invention.

FIG. 2 shows a power grid system 40 utilizing a fault ride through system in accordance with an embodiment of the present invention. The system 40 has a generator 42 connected to the power grid 44. In one embodiment, the generator is of a small power rating for example, less than 10 MW. Further, the generator is mechanically coupled to a turbine (not shown). In one embodiment, the turbine comprises a gas turbine or a gas engine or a wind turbine. In some embodiments, the generator will be coupled to the grid through a power electronic converter (not shown), and in other embodiment the generator will be coupled to the grid without any power electronic converter. The generator 42 is connected to the power grid 44 through the fault ride through system 46, a transformer 48, and a transmission line inductor 50. It should be noted that the FIG. 2 shows a single line diagram of the power grid system for ease of illustration. The fault ride through system 46 includes a variable inductor 52, a variable resistor 54, and a controller 56. The variable inductor 52 is connected in series with the generator 42 whereas the variable resistor 54 is connected across the generator phase terminals. The controller 56 receives two inputs: a grid signal and a generator signal. In one embodiment, the grid signal comprises a voltage signal 58 and the generator signal comprises a generator speed signal 60. The controller uses these signals to provide control signal to control the resistance value of the variable resistor. In one embodiment the controller may also provide a control signal to the variable inductor to control the inductance value of the variable inductor.

In operation, when there is a fault in the grid, the voltage at the point of connection 62 of the generator drops significantly. At this instant, the variable inductor is activated. The inductor is controlled to be not present during normal operation, and controlled (or activated) to provide sufficient inductance during grid fault events. For example, the variable inductor may be controlled by the associated DC current injection with an objective to saturate the inductor (i.e. low inductance or inductor deactivation under normal voltage conditions) and to cancel saturation (i.e. high inductance or inductor activation during the faulty voltage conditions). The current through the variable inductor 52, when activated, results in a voltage drop across the variable inductor 52. During inductor activation, the voltage that appears across the variable resistor becomes a combination of the voltage across the variable inductor and the voltage at the POC. In one embodiment, if the fault voltage at the POC is 0.1 per unit (pu) and the voltage drop across the variable inductor is 0.2 pu, the total voltage across the variable resistor would be 0.3 pu. The active power consumed by the variable resistor during the fault depends on the fault voltage across the resistor and is generally given by $Vr^2/R$, where Vr is the root mean square (RMS) voltage across the resistor and R is the resistance value of the resistor. Thus, if the Vr is 0.3 pu and R is 0.1 pu, then the power consumed by the variable resistor would be 0.9 pu which is almost equivalent to the total power supplied by the generator. In other words, in this case the variable resistor would consume all the power generated by the generator. Thus the generator is able to keep its rotational speed in an acceptable range and does not need to be disconnected from the grid during or after the fault.

Figure 3:
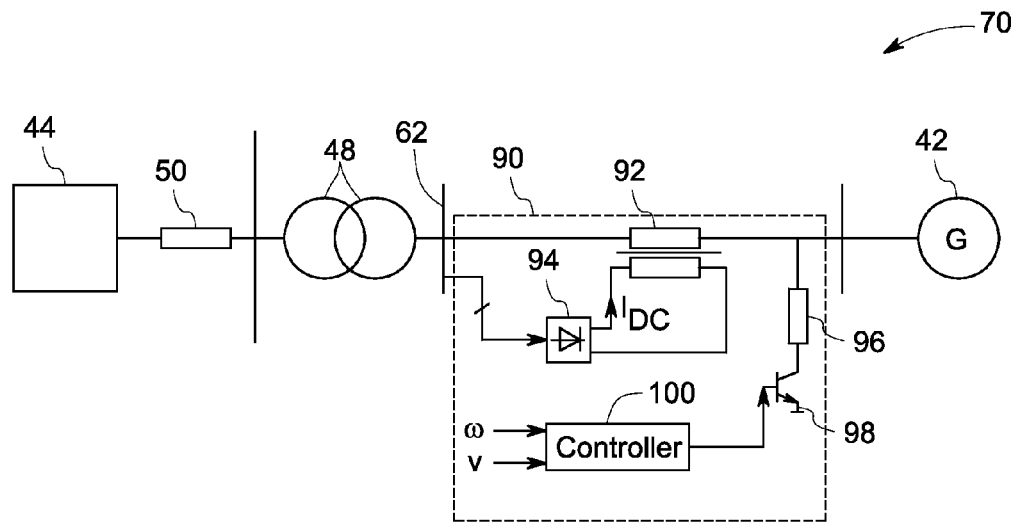
FIG. 3 is a diagrammatical representation of a detailed fault ride through capability system in accordance with an embodiment of the present invention.

FIG. 3 is a power grid system 70 with a detailed view of a fault ride through system 90 in accordance with an embodiment of the present invention. The system includes a transformer 92, a passive circuit 94, a resistor 96, a power electronic converter 98 and a controller 100. The transformer 92 acts as a variable inductor. The controller 100 provides control signals to the power electronic converter and in turn controls the resistance of the resistor. The passive circuit may comprise a passive rectifier such as a diode bridge rectifier, and the power electronic converter may comprise an insulated gate bipolar transistor (IGBT) based converter or an integrated gate commutated thyristor (IGCT) based converter, for example.

The passive rectifier 94 fetches alternating current (AC) power from the grid or the POC and supplies a direct current (DC) current to the transformer 92. When a DC current is supplied to the transformer, the transformer goes into saturation. During saturation, the transformer acts like a short circuit (with minimum inductance). When the system is in stable condition or when there is no fault in the system, it is preferable to have minimal voltage drop across the transformer. Thus, during normal operations, there is a normal voltage across the rectifier and the rectifier supplies DC current to the transformer. In this case the transformer has minimum inductance and hence there will be minimum voltage drop across it. In other words, the grid voltage passively controls the variable inductance of the transformer. If the grid voltage v is present in a normal operating range, a defined amount of DC current is supplied by the passive rectifier to the transformer to operate the transformer in a saturation condition. When the grid voltage is low, the amount of DC current is low or zero and the transformer acts like an inductor. The controller 100 receives two inputs: a grid signal and a generator signal. In one embodiment, the grid signal comprises grid voltage v, and the generator signal comprises generator speed ω. If the grid voltage v within a normal operating range, the controller determines that the system is under normal condition i.e. there is no fault in the system. In another embodiment, the controller 100 receives just a generator signal, e.g. generator speed ω and determines whether the system has a fault based on the generator speed ω. During the fault the generator input power is high and output power is low, hence, the generator accelerates and the generator speed goes up. Thus, based on the generator speed the controller determines whether the system has fault or not.

The controller further provides a resistor control signal to the power electronic converter to control the current into the variable resistor. If the controller determines that the system has a fault based on the grid voltage and/or the accelerating generator speed, it provides a current reference signal or resistor control signal to the power electronic converter. In one embodiment, if the power electronic converter is a IGBT converter, the resistor is connected across the generator for some time and disconnected for some time using a pulse width modulation (PWM) switching for IGBT. The time duration for which the resistor is connected and disconnected across the generator is determined by the control based on the amount of power that needs to be transferred from the generator to the resistor. It should be noted that the resistor may not necessarily be a physically variable resistor but the resistance value observed across the generator terminals may be a variable. In other words by controlling the connection and disconnection time of the resistor, the average resistance value observed across the generator terminals is made to be a variable resistance value. Since the transformer acts as an inductor during the fault, it has some voltage drop across it, which enables the resistor to fetch active power from the generator and thereby maintain the generator speed. In one embodiment, when the controller detects that there is no fault in the system, the controller provides the reference current signal or the resistor control signal to the power electronic converter to disconnect the variable resistor from the generator output terminals and thus the generator supplies power to the grid during normal operating conditions.

Figure 4:
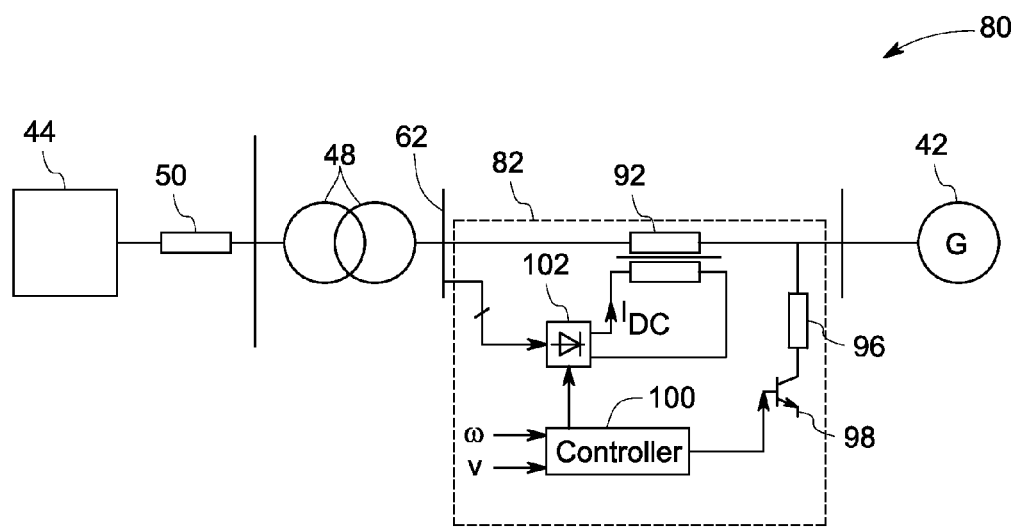
FIG. 4 is a diagrammatical representation of another detailed fault ride through capability system in accordance with an embodiment of the present invention.

FIG. 4 is a power grid system 80 with another detailed view of a fault ride through system 82 in accordance with an embodiment of the present invention. Similar to FIG. 3, the system 82 includes a transformer 92, a rectifier 102, a resistor 96, a power electronic converter 98 and a controller 100. However, in this embodiment, the rectifier 102 is a controlled rectifier i.e., the voltage output of the rectifier is controllable. In one embodiment, the controlled rectifier comprises an IGBT based rectifier. The controller 100 provides control signals to the controlled rectifier 94 and in turn controls the inductance of the transformer. The controlled rectifier 94 fetches AC power from the grid and supplies a controlled amount of DC current to the transformer 92. During normal operations, the controlled rectifier supplies controlled DC current to the transformer such that the transformer has minimum inductance and hence there will be minimum voltage drop across it. During fault condition, the controller provides a control signal to the controlled rectifier such that no current is supplied by the controlled rectifier to the transformer and the transformer operates at maximum inductance. This results in a significant voltage drop across the transformer which in turn helps in transferring the generator power to the resistor during fault.

While the variable inductor is represented as a transformer with a controlled DC current in an embodiment of the present invention, a physical inductor may also be used in another embodiment. When a physical inductor with a fixed inductance value is used in the system, a switch is connected across the inductor. During normal condition, the switch is turned on short circuiting the inductor and during the fault condition, the switch is turned off thus connecting the inductor in series with the generator. In one embodiment, the switch is a power electronic switch such as IGBT or IGCT.

Figure 5:
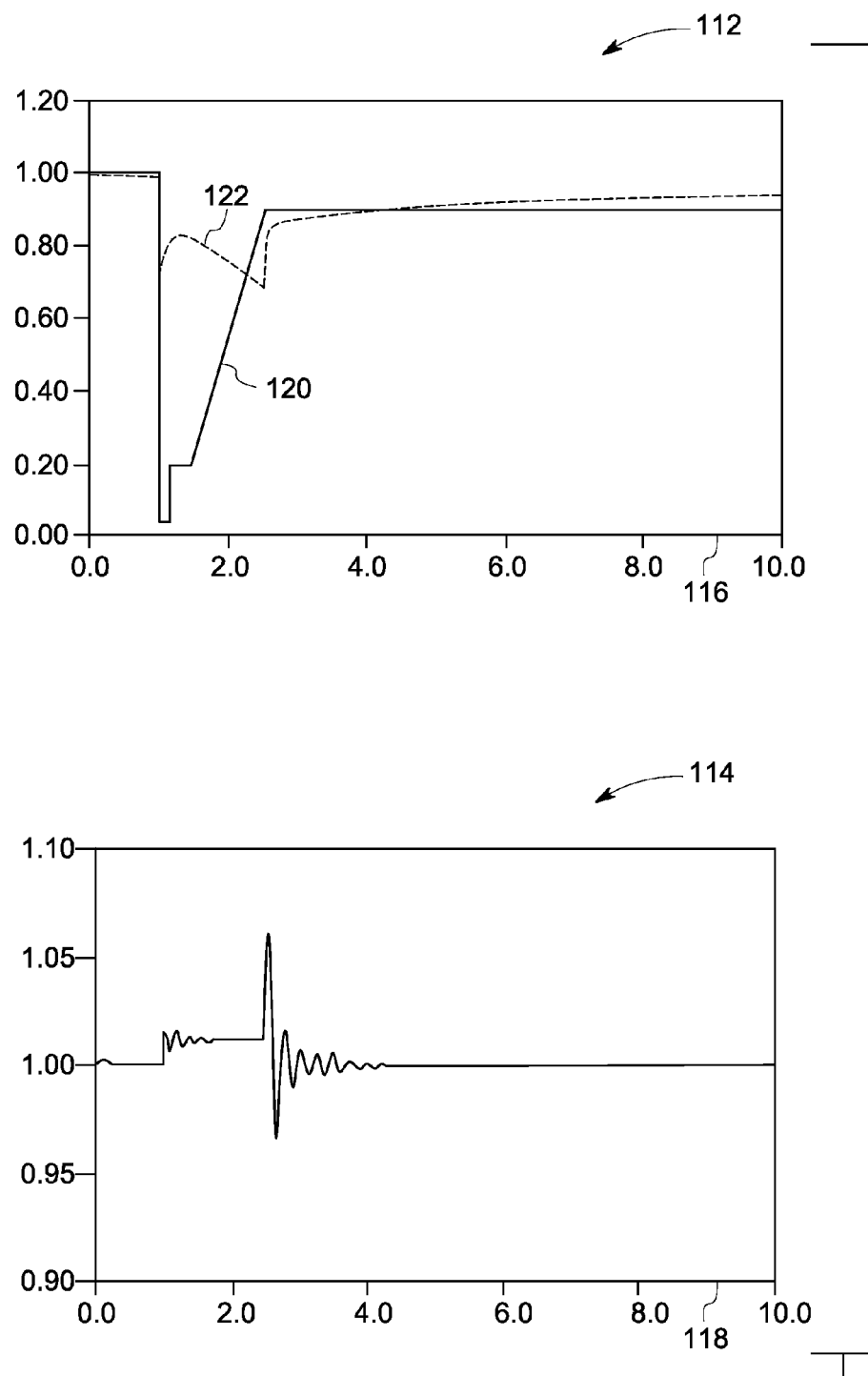
FIG. 5 is a simulation plot of a generator speed response and a voltage response of the generator during a low voltage ride through event in accordance with an embodiment of the present invention.

FIG. 5 is a simulation plot of a generator voltage response 112 and a generator speed response 114 when the fault ride through system of the present invention is utilized in the grid. The horizontal axes 116 and 118 of both responses represent time in seconds. The generator voltage response shows two curves, the grid voltage 122 and the generator voltage 120. The fault occurs in the grid at 1 second and completely clears at 2.5 seconds. Hence, at 1 second the grid voltage drops to 0.05 pu and at 2.5 seconds the grid voltage restores to 0.9 pu approximately. However, even though the grid voltage drops down to 0.05 pu during fault, the generator voltage remains above 0.7 pu approximately. This is due to the voltage drop across the inductor or the transformer 92 connected in series with the generator as shown in FIG. 3. The voltage drop across the inductor during the fault is around 0.65 pu, so the generator voltage is inductor voltage plus the grid voltage and is equivalent to 0.7 pu approximately. Similarly, the speed response shows that the generator speed 124 during the fault is higher than the normal speed i.e. 1.01 pu. However, post fault the generator speed restores back to 1 pu and the generator stays synchronized and operational Thus, it can be seen that irrespective of some small speed disturbance during the fault, the system returns back to a stable state quickly and has fault ride through capability.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power generation system comprising:
   a generator mechanically coupled to a turbine to generate electrical power;
   a fault ride through system comprising a variable resistor connected in parallel across output terminals of the generator to absorb power from the generator during a grid fault condition and a variable inductor connected between an output terminal of the generator and a power grid;
   a controller to generate an inductor control signal to operate the variable inductor at a minimum inductance value during normal operating conditions of the power grid and at a higher inductance value during a fault condition of the power grid.

2. The system of claim 1, wherein the generator power rating is lower than 10 MW.

3. The system of claim 1, wherein the turbine comprises a gas turbine or a gas engine.

4. The system of claim 1, wherein the turbine comprises a wind turbine.

5. The system of claim 1, wherein the controller is configured to generate the inductor control signal based on a grid signal and a generator signal.

6. The system of claim 5, wherein the grid signal comprises a grid voltage.

7. The system of claim 5, wherein the generator signal comprises a generator speed.

8. The system of claim 1 further comprising a passive circuit to operate the variable inductor at a minimum inductance value during normal operating conditions of the power grid, and at a higher inductance value during a fault condition of the power grid.

9. The system of claim 8, wherein the passive circuit comprises a diode bridge rectifier.

10. The system of claim 2, wherein the controller is configured to generate a resistor control signal to disconnect the variable resistor from the generator output terminals during normal operating conditions.

11. The system of claim 1, wherein the variable resistor comprises a switch controlled resistor.

12. The system of claim 11, wherein the switch controlled resistor comprises a IGBT controlled resistor or IGCT controlled resistor.

13. The system of claim 1, wherein the variable inductor comprises a transformer.

14. The system of claim 13, further comprising a IGBT based converter configured to inject a DC current into the transformer during normal operating conditions of the power grid.

15. A method of supplying electrical power to a power grid from a power generation system comprising a variable inductor connected between a generator and the power grid and a variable resistor connected across output terminals of the generator, the method comprising:
   controlling the variable inductor to have a lower inductance during normal operating conditions and a higher inductance during fault conditions so as to develop a voltage across the variable resistor during fault conditions; and
transferring output power of the generator to the variable resistor during fault conditions.

16. The system of claim 15, wherein controlling the variable inductor comprises operating the variable inductor at a minimum value during the normal operating conditions.

17. The system of claim 15 wherein controlling the variable inductor comprises operating the variable inductor at a maximum value during the fault conditions.

18. The method of claim 15, wherein transferring output power of the generator to the resistor comprises controlling the variable resistor.

19. The method of claim 18, wherein controlling the variable resistor comprises controlling the current in the variable resistor via PWM control of a power electronic converter.

* * * * *

UNITED STATES PATENT AND TRADEMARK OFFICE
CERTIFICATE OF CORRECTION

PATENT NO. : 8,692,523 B2  
APPLICATION NO. : 12/611988  
DATED : April 8, 2014  
INVENTOR(S) : Drobnjak et al.

It is certified that error appears in the above-identified patent and that said Letters Patent is hereby corrected as shown below:

In the Claims

In Column 7, Line 5, in Claim 16, delete "system" and insert -- method --, therefor.

In Column 7, Line 8, in Claim 17, delete "system" and insert -- method --, therefor.

Signed and Sealed this  
Second Day of December, 2014

Michelle K. Lee  
*Deputy Director of the United States Patent and Trademark Office*